United States Patent [19]

Walton

[11] 4,336,362
[45] Jun. 22, 1982

[54] ACETYLENE-TERMINATED DIANIL MONOMER AND THE POLYMER THEREFROM

[75] Inventor: Theodore R. Walton, Annandale, Va.

[73] Assignee: The United States of America as represented by the Secretary of the Navy, Washington, D.C.

[21] Appl. No.: 239,833

[22] Filed: Mar. 2, 1981

Related U.S. Application Data

[62] Division of Ser. No. 102,293, Dec. 10, 1979, Pat. No. 4,283,557.

[51] Int. Cl.$^3$ .............................................. C08F 38/00
[52] U.S. Cl. .................................... 526/248; 526/285
[58] Field of Search ................................ 526/248, 285

[56] References Cited

U.S. PATENT DOCUMENTS 4,218,555  8/1980  Antonoplos et al. ............... 526/285
4,283,557  8/1981  Walton ............................... 526/285

Primary Examiner—Harry Wong, Jr.
Attorney, Agent, or Firm—Robert F. Beers; William T. Ellis; Thomas E. McDonnell

[57] ABSTRACT

A compound with the formula:

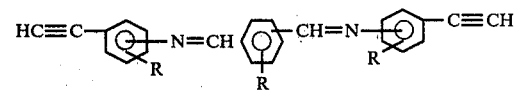

wherein R is selected from the class consisting of H—, F—, Cl—, $CH_{3-n}F_n$, and $CH_{3-n}Cl_n$ and n is an integer from 1 to 3 and the polymer resulting therefrom by heating at a temperature from about the melting point to about 300° C. The polymer is suitable as a high-temperature structural material and a semiconductor material.

6 Claims, No Drawings

ACETYLENE-TERMINATED DIANIL MONOMER AND THE POLYMER THEREFROM

This is a division of application Ser. No. 102,293, filed on Dec. 10, 1979, and upon which U.S. Pat. No. 4,283,557 has issued.

BACKGROUND OF THE INVENTION

The present invention pertains generally to electrically conducting polymers and in particular to a conducting, aromatic, conjugated polymer system.

Electrically conductive polymers offer many precessing advantages over metals. Unfortunately, few polymers are conductive. In order to impart a degree of conductivity to polymers, a conductive filler, e.g. copper or silver powder or conductive carbon, is usually added to a polymer, but loaded polymers have numerous problems. Only a low loading and therefore a small degree of conductivity is possible without seriously affecting the properties of the polymer. In terms of thermal stability, the present polymers cannot function at temperatures much above 200° C. The few polymers which can be used in the 200°-300° C. range for at least short periods of time have very complex curing characteristics and are difficult to process.

Presently, the most promising polymer which is conductive without a loading of metal powder is the dianilphthalonitrile polymers disclosed and claimed in U.S. Pat. No. 4,116,945 issued to James R. Griffith and Jacque O'Rear on Sept. 26, 1978. The disadvantages of this polymer are hydrolytic instability of the uncured resin and a relatively high, initial processing temperature, i.e., the temperature at which polymerization begins.

SUMMARY OF THE INVENTION

It is, therefore, an object of the present invention to synthesize an electrolytically conductive polymer having a high thermal stability.

Another object of the present invention is to synthesize a polymer which is electrolytically conductive without the inclusion of electrolytically conductive metal powder.

A further object of the present invention is to synthesize an electrolytically conductive polymer which is hydrolytically stable as a resin and requires a relatively low initial processing temperature.

These and other objects are achieved from the three-dimensional network polymer obtained from completely conjugated, acetylene-terminated terephthalylidene anilines.

DETAILED DESCRIPTION OF THE INVENTION

The prepolymer of the present invention is represented by the formula:

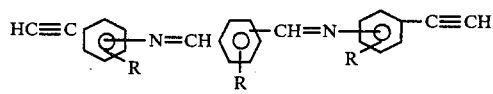

where R is selected from the class consisting of H—, F—, Cl—, $CH_{3-n}F_n$, and $CH_{3-n}Cl_n$ and n is an integer from 1 to 3. The preferred prepolymer is N, N'-terephthalylidene bis-(3-ethynylanilene).

Preparation of the prepolymer is schematically shown as follows:

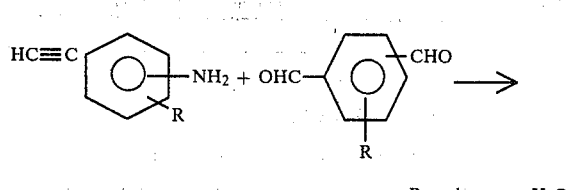

Prepolymer + H₂O

The preparation comprises reacting an amino-phenylacetylene with a terephthaldehyde in an amino-aldehyde mole ratio of at least 2:1 in a suitable solvent. A slight excess (5 to 10 mole percent) of this aminophenylacetylene is preferred in order to ensure the complete reaction of both aldehyde groups. If the synthesis is carried out in a refluxing azeotropic solvent such as toluene, benzene or xylene, the reaction can be followed by measuring the water evolved during the reaction. If a non-refluxing solvent, e.g., acetonitrile or dimethylformamide is used, the reaction is carried out at room temperature and is monitored by infrared analysis.

In order to demonstrate the preparation of the prepolymers of the present invention, the following examples are given. It is understood that these examples are given by way of illustration and are not intended to limit the present specification in the claims to follow in any manner.

EXAMPLE I

Preparation in Toluene 24.6 g (0.21 moles) of 3-aminophenylacetylene (5% excess) and 200 ml of toluene were placed in a round bottom 3-neck flask fitted with a mechanical stirrer, dripping funnel, Dean Stark trap attached to a water cooled condenser, and a heating mantel. The 13.4 g (0.10 moles) of terephthaldehyde were dissolved in 300 ml of toluene and placed in the dropping funnel. The 3-aminophenyl acetylene solution was heated to reflux (solution temperature 115° C.) and the dialdehyde added dropwise with stirring over a 1 hour period. In the table below is shown the course of the reaction as a function of the amount of water collected in the Dean Stark trap. After 44 hours the reaction was stopped, cooled to 100° C. and the hot solution filtered. The volume of the filtrate was reduced to approximately 300 ml, and the hot solution allowed to slowly cool to room temperature and then placed in refrigeration for approximately 1 hour. The precipitate was isolated by filtration yielding 25.6 grams of crude product, mp 136°-138° C. An additional 4.8 g of product was obtained by reducing the filtrate volume to 100 ml and cooling in the refrigerator overnight. The melting point for the additional product was 134° to 138° C. The total yield of crude product was 91.6%. The crude product was recrystallized from absolute ethyl alcohol with an overall recovery of 95% and melting point of 138.5°-139.5° C.

TABLE I

| Reaction Time, Hrs | Water Collected, ml | Percent Reaction Completed 3.6 theory |
| --- | --- | --- |
| 0.00 | 0.0 | 0.0 |
| 1.83 | 1.2 | 33.3 |
| 2.25 | 1.6 | 44.4 |
| 19.25 | 3.2 | 88.9 |
| 26.00 | 3.5 | 97.2 |

TABLE I-continued

| Reaction Time, Hrs | Water Collected, ml | Percent Reaction Completed 3.6 theory |
|---|---|---|
| 42.00 | 3.5 | 97.2 |

EXAMPLE II

Preparation in Acetonitrile 2.45 g (0.021 moles) of 3-aminophenylacetylene (5% excess) and 20 ml of acetonitrile (dried over molecular sieve) were placed in a 100 ml round bottom flask fitted with a magnetic stirrer. A solution of 1.34 g (0.01 mole) of terephthalaldehyde in 32 ml of dry acetonitrile was added over a 10 minute period to the stirred solution of 3-aminophenylacetylene. The mixture was stirred at room temperature for 6 hours, filtered, and the solvent stripped off using a rotating evaporator to give a bright yellow product, mp 138°–140° C. The crude product was purified by recrystallization from abs. ethyl alcohol using anhydrous $Na_2SO_4$ to remove the water formed in the reaction. Melting point of pure material was 139°–140° C.

The polymer resin is obtained from the prepolymer by heating the prepolymer at a temperature from about the melting point to about 300° C. Preferably, the cure is completed in steps in order to develop maximum strength in the polymer. The heating schedule which produced the strongest polymer in the least amount of time was 150° C. for two hours, 200° C. for one hour, 250° C. for one hour, and 300° C. for 50 hours. It is also preferred that the polymer is postcured at a temperature above 300° C. in an inert atmosphere, e.g. $N_2$, Vac., Ar in order to further increase the mechanical strength and electrical conductivity. The postcure is also preferably done in steps with the best schedule being 400° C. for 100 hours, 500° C. for 100 hours, and 600° C. for 100 hours.

The polymerization can be stopped at the B-stage and the polymer, a frangible solid can be stored for later use. The advantage of this technique is the lower temperature at which the B-stage polymer melts and thus the lower temperature at which the polymer can be applied. The B-stage polymer is obtained by melting the prepolymer and continuing to heat the melt until the viscosity of the melt beings to increase due to the onset of polymerization which is termed the B-stage. To obtain the C-stage, the B-stage polymer is melted and heated at a temperature from about 140° C. to about 300° C.

The polymerization occurs at the acetylene groups which form aromatic ring or conjugated structures. The resulting polymer is a completely conjugated, infinite, three-dimensional network polymer.

In order to demonstrate the preparation and the properties of the polymers of the present invention, the following example is given. This example is given by way of illustration and is not meant to limit the specification or the claims to follow in any manner.

EXAMPLE III

A 10 g sample of the material prepared in Example I was heated at 150° C. for one hour, at 200° C. for one hour, at 250° C. for one hour, and at 300° C. for 50 hours. The resulting polymer was postcured according to the schedule shown in Table II which also contains the weight loss and electrical resistivity of the polymer after each stage of postcure.

TABLE II

| Temp./Time | Weight Loss | Resistivity |
|---|---|---|
| 400° C./100 hrs. | 5.0% | $10^{10}$ ohm-cm |
| 500° C./100 hrs. | 10.2% | $9.4 \times 10^5$ ohm-cm |
| 600° C./100 hrs. | 13.0% | $1.2 \times 10^1$ ohm-cm |

As the results of Example III demonstrate, the polymer of the present invention combines high thermal stability and electrical conductivity in a single material. Of particular importance is that a conductance in the semi-conductor range is obtained without the need of including a conductive metal.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. The polymer obtained by heating from about the melting point to about 300° C. the compound with the formula

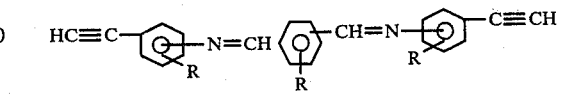

wherein R is selected from the class consisting of H—, F—, Cl— $CH_{3-n}F_n$, and $CH_{3-n}Cl_n$ and n is an integer from 1 to 3.

2. The polymer of claim 1 wherein R is —F or —$CF_3$.

3. The polymer of claim 1 wherein R is —Cl or —$CCl_3$.

4. The polymer of claim 1 wherein R is —H.

5. The polymer of claim 4 wherein the imine groups are attached para to each other.

6. The polymer of claim 1 wherein the acetylene groups are attached meta to the imine groups.

* * * * *